Jan. 10, 1933. Y. TAKAHASHI 1,893,970
FLOWER SUPPORT
Filed Oct. 29, 1930

INVENTOR,
YEINOSUKE TAKAHASHI.
BY Donald K. Lippincott
ATTORNEY.

Patented Jan. 10, 1933

1,893,970

UNITED STATES PATENT OFFICE

YEINOSUKE TAKAHASHI, OF MONTARA, CALIFORNIA

FLOWER SUPPORT

Application filed October 29, 1930. Serial No. 491,883.

My invention relates to flower supports or artificial stems, for use in the formation of corsages and other forms of bouquets.

Among the objects of my invention are: First, to provide a flower support which will not break the stem; second, to provide a support which will hold the flower firmly and permit its adjustment in any desired position; third, to provide a support which will serve as a form for an entire bouquet; fourth, to provide a support which may be preformed and which will permit a bouquet to be assembled easily and rapidly.

Other objects of my invention will be apparent or will be specifically pointed out in the description forming a part of this specification, but I do not limit myself to the embodiment of my invention herein described, as various forms may be adopted within the scope of the claims.

Referring to the drawing.

Most corsages and other small bouquets are formed upon "stems" comprising a sliver of wood, to one end of which is attached a length of fine gage wire. The wood "stem" is placed beside the stem of the flower, and a turn of the wire is taken to bind the two together. A second flower is then added, an additional turn taken, and so forth until the bouquet is complete, when the end of the wire is wrapped about the whole to bind it firmly in place. This arrangement has the disadvantage of taking considerable time and skill to form a graceful bouquet, and the additional disadvantage that the fine wire tends to cut the stem of the flower, causing it to wilt quickly and to droop.

With the support of my invention the bouquet may be more quickly formed, the flowers may be adjusted to any desired position after the bouquet is complete, and, because it is possible to use wire of larger gage, there is no tendency to cut the stem and cause drooping of the flowers.

Broadly considered, my invention comprises a malleable wire support bent to form a plurality of grips for receiving a flower stem, the grips being so arranged that the stem of each flower will be engaged by at least two. The grips preferably comprise V-shaped folds formed in the wire and projecting transversely to its axis. The flower stem is laid within these folds, which are squeezed together to hold the stem firmly and permanently.

In its simplest form, the flower support of my invention comprises a length of malleable wire 1, preferably soft annealed iron wire or other material having similar properties. At the requisite distance from the end of the wire to form a stem of suitable length, it is bent at right angles and then back upon itself to form a substantially V-shaped loop or grip 2, after which it is carried on in its original direction for a distance of perhaps one inch, and a second substantially V-shaped grip 3 is formed.

The holder is used by laying the flower stem 4 in the two open V-shaped grips and squeezing them together to grasp the stem as shown. Several stems may be held by the same pair of grips.

Figure 3:
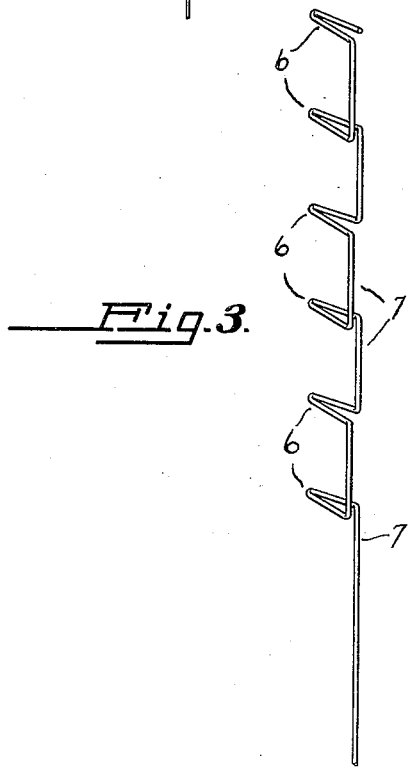
Figure 3 is a perspective view showing a modified form of support adapted for holding a spray.

Figure 3 shows a modification useful for holding long sprays. A plurality of grips 6 are formed along a single length of wire 7. The flowers may be arranged in any desired manner along this support, it merely being necessary that two of the grips engage the stem of each flower.

Figure 2:
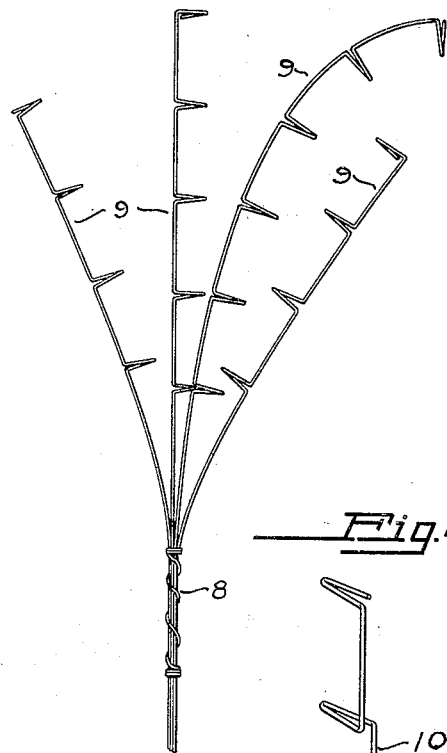
Figure 2 is a view showing a bouquet form embodying a plurality of the supports.

Several of these simple holders may be combined to make a bouquet support as is shown in Figure 2. Here four of the supports 9 are secured together, as by twisting or by welding, each support serving to hold its own particular flower or group of flowers, and the combined stems forming a comparatively rigid handle 8 for the bouquet. By bending the support, either below or between the grips, the flowers may be constrained in any position desired. In this manner sprays, shower bouquets, and the like can be given graceful and attractive form.

In order that the supports may be as inconspicuous as possible, it is frequently desirable that they be colored. For this purpose they may either be wrapped with colored cloth or paper as in the formation of stems for artificial flowers, or they may be dipped in green or neutral colored paint, in which case they are almost invisible among the flower stems, and are entirely invisible if the bouquet be suitably constructed.

Figure 1:
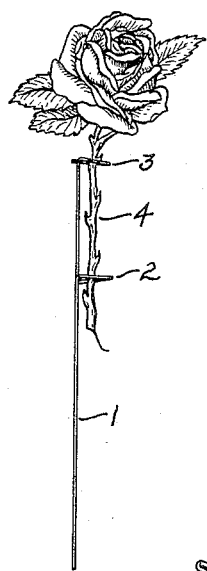
Figure 1 shows a single support embodying my invention and holding the stem of a flower.
Figure 4:
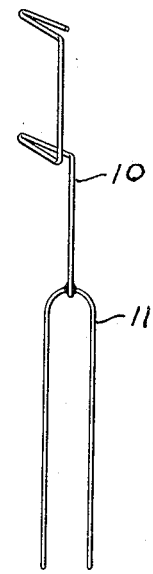
Figure 4 shows another modification primarily adapted for securing flowers to moss forms.

Another modification is shown in Figure 4, wherein the simple support 10, formed in the same manner as that shown in Figure 1, is welded or otherwise fastened to the curve of a substantially U-shaped wire 11 to provide a pair of projecting prongs. These prongs may be inserted in a form, usually covered with moss, to hold the flower or flowers held by the support in a definite desired position.

I claim:

1. A flower support comprising a malleable wire bent to form a plurality of grips, each grip comprising a substantially V-shaped fold whose apex projects transversely from the axis of the support.

2. A support for holding flowers and the like comprising a malleable wire bent to form a plurality of grips arranged to permit at least two grips to engage the stem of each flower supported, each grip comprising a substantially V-shaped fold whose apex projects transversely from the axis of the support.

3. A bouquet support comprising a plurality of branching malleable wires, each wire being bent to form a plurality of grips, and each grip comprising a substantially V-shaped fold whose apex projects transversely from the axis of the support.

4. In a wire support for flowers and the like, a stem holder comprising a pair of folds spaced along the wire, each fold being bent outward from the axis of the wire and returning upon itself in a plane approximately perpendicular to the axis of the wire.

In testimony whereof, I have hereunto set my hand.

YEINOSUKE TAKAHASHI.